Nov. 14, 1939.   C. L. EKSERGIAN   2,179,656
DISK WHEEL
Filed July 29, 1937
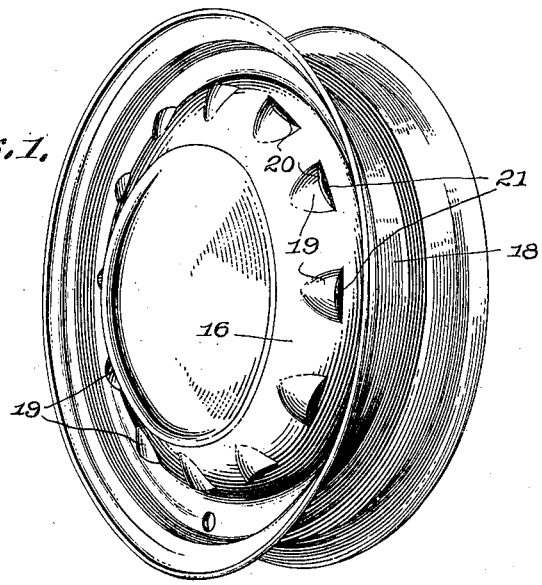
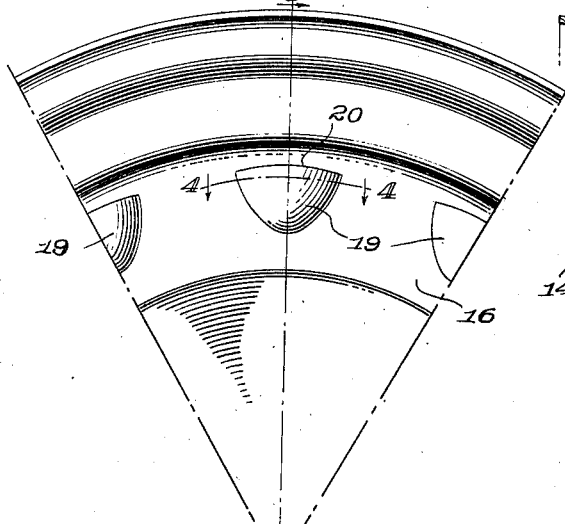
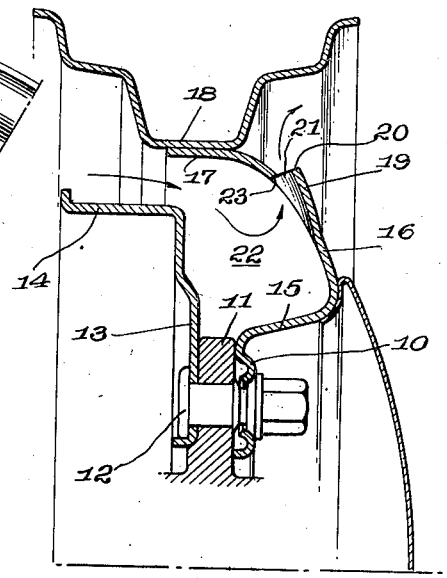
INVENTOR.
Carolus L. Eksergian
BY John P. Barbox
ATTORNEY.

Patented Nov. 14, 1939

2,179,656

UNITED STATES PATENT OFFICE 2,179,656

DISK WHEEL

Carolus L. Eksergian, Detroit, Mich., assignor to Budd Wheel Company, Philadelphia, Pa., a corporation of Pennsylvania Application July 29, 1937, Serial No. 156,359

3 Claims. (Cl. 301—6)

The invention relates to wheels and more particularly to disk wheels.

It is an object of the invention to construct such wheels so as to provide better cooling of the brake drum associated therewith.

A further object of the invention is to provide a construction capable of achieving the forementioned object and at the same time permit considerable variation in design to meet the demands of customers and to give to the wheel so constructed, a pleasing appearance. The modern dished disk wheel is of relatively small diameter having its outer periphery upon which the rim is seated, spaced by a very small distance radially outwardly of the brake drum associated therewith. It is not feasible to greatly reduce the diameter of the drum in view of the demand for greater safety at the high speeds at which modern cars are operated. With the outer periphery of the brake drum so close to the rim, a dead air pocket is formed between the disk wheel body and the brake drum, with the result that the brake drum becomes overheated, especially where continuous or frequent application of the brake is required.

To overcome this difficulty and at the same time provide a disk wheel body which is pleasing in appearance and the appearance of which can be varied to satisfy the customer, I form the disk wheel body in its radially outer areas with an annular series of embossments pressed axially outward and having their radially outer margins severed from the body of the disk and spaced therefrom to provide ventilating openings extending from the inner face of the disk to the outer, the hollows on the inner face of the disk formed by the embossments providing radially extending channels leading to said openings. This construction lends itself substantially to the same ease of manufacture as a plain dished disk and does not materially increase its cost.

In the drawing:

Fig. 1 is a perspective view of a wheel according to the invention.

Fig. 2 is a front elevational view of a sector of the wheel, on a somewhat enlarged scale from that shown in Fig. 1.

Fig. 3 is a sectional view of the wheel including its mounting on the hub and the brake drum associated therewith, the section being taken substantially along the line 3—3 of Fig. 2.

Fig. 4 is a sectional view taken substantially along the line 4—4 of Fig. 2 through one of the embossments.

As shown in the drawing, the disk wheel body may comprise a substantially radial extending bolting on flange 10, seated against the hub flange 11 and secured to the hub flange by a circle of bolts, one of which is indicated at 12. The brake drum 13 is also secured to the hub flange and extends radially outwardly and terminates peripherally at a point close to the rim in the cylindrical braking annulus 14.

The wheel body outwardly of the bolting on flange is formed with a generally axially outwardly extending portion 15 which merges with the generally conical portion 16 extending out to the rim and provided at the outer periphery with an axially extending flange 17 which, in this case, overlies the periphery of the brake drum, this flange being adapted to seat and secure the rim 18 to the wheel body.

In the outer peripheral areas of the wheel body, in this instance, in the conical portion 16 and preferably at a point adjacent the rim, it is formed with an annular series of embossments 19. These embossments have their outer margins 20 severed from the body of the disk and spaced therefrom to provide openings 21 opening radially outwardly from the inner face of the disk to the outer, the axially inner hollows formed by the embossments providing radial channels leading to said openings.

In the operation of the car equipped with these wheels, under the action of centrifugal force, the air would be drawn from the pocket 22 formed between the brake drum and the wheel body through the radial channels leading to and through the openings 21 and fresh air will flow inward over the brake drum into the pocket to replace it as indicated by the arrows in Fig. 3. Thus there is assured a continuous circulation of air over the brake drum and out through the openings 21 resulting in an efficient cooling of the drum.

In the form shown, the embossments are of relatively small radial extent as compared with their circumferential extent and the axial depth of the embossments from their radially inward ends where they merge with the disk body increases quite rapidly from these ends to their radially outer ends. It is obvious, however, that the radial and circumferential extent as well as the rate of emergence from the disk body are subject to wide variation in producing the design most pleasing to the customer, all without sacrifice of the mechanical advantages pointed out. As shown in Fig. 3, the free margin 20 of an embossment 19 projects radially outwardly somewhat beyond the margin 23 of the disk body at the opening 21. This renders the openings invisible when the wheel is viewed in front elevation which is desirable from an appearance standpoint.

The embossments are readily formed in the usual manufacturing operations incident to the forming of a wheel body, the only change required being in the dies, the disk body being first formed with an annular series of slits and the embossments being then pressed axially outwardly radially inwardly of said slits.

As shown in Fig. 2, the outer margins 20 of the embossments lie substantially on a circle concentric with the rim which adds further to the pleasing appearance of the wheel.

The openings 21 have the still further function of providing ease of attachment for the tire chains, the straps of which may be readily passed through the openings 21 to secure the chains in place.

What I claim is:

1. A disk wheel body having a substantially radially extending mounting portion, and a deeply dished portion extending from said mounting portion to the rim, said dished portion being formed with an annular series of embossments pressed to extend axially outwardly of the body of the disk, the radially outer margins of said embossments being arranged substantially on a circle concentric with the rim, and providing openings to the outer face of the disk between said margins and the disk body for the circulation of air by centrifugal action from the inner face of the disk to the outer.

2. A dished disk wheel body having its outer peripheral portion adjacent the rim formed with an annular series of embossments pressed axially outwardly and increasing in depth radially outwardly to their radially outer margins, said margins being severed from the body of the disk and providing openings between them and the body of the disk opening radially outwardly from the inner face to the outer face of the disk for the circulation of air by centrifugal action from the inner face of the disk to the outer.

3. A wheel comprising a hub flange having a bolt circle and a brake drum secured to said flange and extending radially outwardly from said bolt circle, and a disk wheel body having a mounting portion secured by said bolt circle to the hub flange and a deeply dished portion outwardly of said mounting portion having its outer periphery but slightly spaced from the periphery of the brake drum, whereby a pocket is formed between the body of the disk and the brake drum, and means for drawing air by centrifugal action from said pocket and causing air to be sucked over said brake drum between it and the periphery of the body cooling the drum, said means comprising an annular series of embossments pressed axially outwardly of the disk body, said embossments having their radially outer margins severed from the body and spaced therefrom to provide openings for the circulation of air from the inner face of the disk to the outer.

CAROLUS L. EKSERGIAN.